United States Patent [19]
Bonaddio

[11] 3,983,771
[45] Oct. 5, 1976

[54] APPARATUS FOR PRECISE SUBDIVISION OF GLASS SHEETS

[75] Inventor: Robert M. Bonaddio, Monroeville, Pa.

[73] Assignee: PPG Industries, Inc., Pittsburgh, Pa.

[22] Filed: Nov. 28, 1975

[21] Appl. No.: 636,008

[52] U.S. Cl. ................................. 83/11; 83/425.3; 83/664; 83/8
[51] Int. Cl.² .......................................... B26D 3/08
[58] Field of Search ......... 83/11, 664, 425.2, 425.3, 83/425.4, 8, 7

[56] References Cited
UNITED STATES PATENTS

| | | |
|---|---|---|
| 3,742,793 | 7/1973 | Gray et al. ............................. 83/11 |
| 3,821,911 | 7/1974 | Seme ..................................... 83/11 |
| 3,834,258 | 9/1974 | Zumstein .............................. 83/11 |

*Primary Examiner*—Donald R. Schran
*Attorney, Agent, or Firm*—Dennis G. Millman

[57] ABSTRACT

A row of spacer blocks double as spacing means and scoring wheel holders so that a plurality of parallel score lines may be placed on a sheet of glass with a high degree of precision in the spacing of the score lines.

5 Claims, 11 Drawing Figures

APPARATUS FOR PRECISE SUBDIVISION OF GLASS SHEETS

BACKGROUND OF THE INVENTION

This invention relates to an apparatus for cutting glass, more particularly, to the scoring of glass sheets preparatory to severing them into small rectangles or squares.

The type of glass cutting to which this invention is directed involved making a physical discontinuity, or score, on the surface of a sheet of glass or near the surface or both, followed by the application of a bending moment about the score line to snap the glass along the score line. The present invention is directed to an improvement in the means for placing the scores on a sheet of glass in the particular case of a relatively large sheet being subdivided into a large number of small pieces.

The prior art has advanced from the time-consuming practice of manually making each score individually to the use of ganged sets of scoring tools which simultaneously make a plurality of parallel scores in a single pass. These prior art devices are typically intended for such applications as subdividing large sheets of glass into a plurality of window panes, microscope slides, or blanks which are subjected to subsequent cutting operations and the like. Such applications generally have relatively liberal tolerance requirements, and therefore the scoring means used do not provide for the highly accurate spacing now required for certain specialized applications. One area in which a need for greater accuracy is required is in the process where a large number of discrete, electrically conductive patterns are coated onto a sheet of glass, and the sheet is subsequently subdivided into small rectangles with a pattern accurately located on each rectangle. Typical tolerance requirements for the cut products of this type are sometimes as small as ± 0.002 inch (± 0.050 millimeters).

In many prior art glass multi-cutters, each scoring head is individually clamped or bolted in place, and the spacing between each scoring head is established manually. The following U.S. Patents show typical arrangements:

U.S. Pat. No. 2,377,096....Owen
U.S. Pat. No. 3,286,893....Zellers
U.S. Pat. No. 3,290,973....Oakes et al.
U.S. Pat. No. 3,537,344....Walsall et al.
U.S. Pat. No. 3,716,176....Yamada et al.

U.S. Pat. No. 3,626,795 to White shows a multi-cutter having spacer rings between each scoring head, and U.S. Pat. No. 3,151,794 to Brand discloses an arrangement wherein the spacing between a plurality of scoring heads is determined by adjustable bars. None of these prior art arrangements is particularly suited for eliminating the several sources of imprecision in the spacing of the score lines that are produced.

Major improvements in accurately locating a plurality of score lines are disclosed in U.S. Pat. Nos. 3,859,878 and 3,880,029, both to Bonaddio et al. There, the improvement is largely attributable to the use of a single, precision-made, interchangeable shaft guide for each scoring pattern. In order to reduce tolerances even further, it would be desirable to eliminate the clearance that is required between each scoring tool shaft and its shaft guide as well as the clearance that is necessary for a scoring wheel holer to pivot at the end of each shaft. it would further improve accuracy if the wobble of a scoring wheel within a slotted wheel holder could be reduced.

SUMMARY OF THE INVENTION

A high degree of precision in spacing a plurality of parallel score lines on a piece of glass is attained with the present invention by providing a scoring wheel mounting arrangement which substantially reduces the inaccuracies introduced by separate wheel holders, shafts, shaft holders, and any separate spacing means employed. This is accomplished in the present invention by combining the functions of wheel holders and spacing means in a row of spacer blocks whose contiguous surfaces can be flat ground and polished with a high degree of accuracy. An indentation in each block forms with an adjacent block a slot for receiving a scoring wheel. This arrangement permits the spaces between the scoring wheels to be very accurately established, and also enables the wheel slots to be machined with a very small clearance so that wheel wobble is minimized. At the same time, versatility is retained by making the spacer blocks readily interchangeable so that the spacing of the scores can be quickly and easily changed when the need arises.

DETAILED DESCRIPTION

A thorough understanding of the invention may be gained from the following detailed description taken together with the drawings in which.

Figure 1:
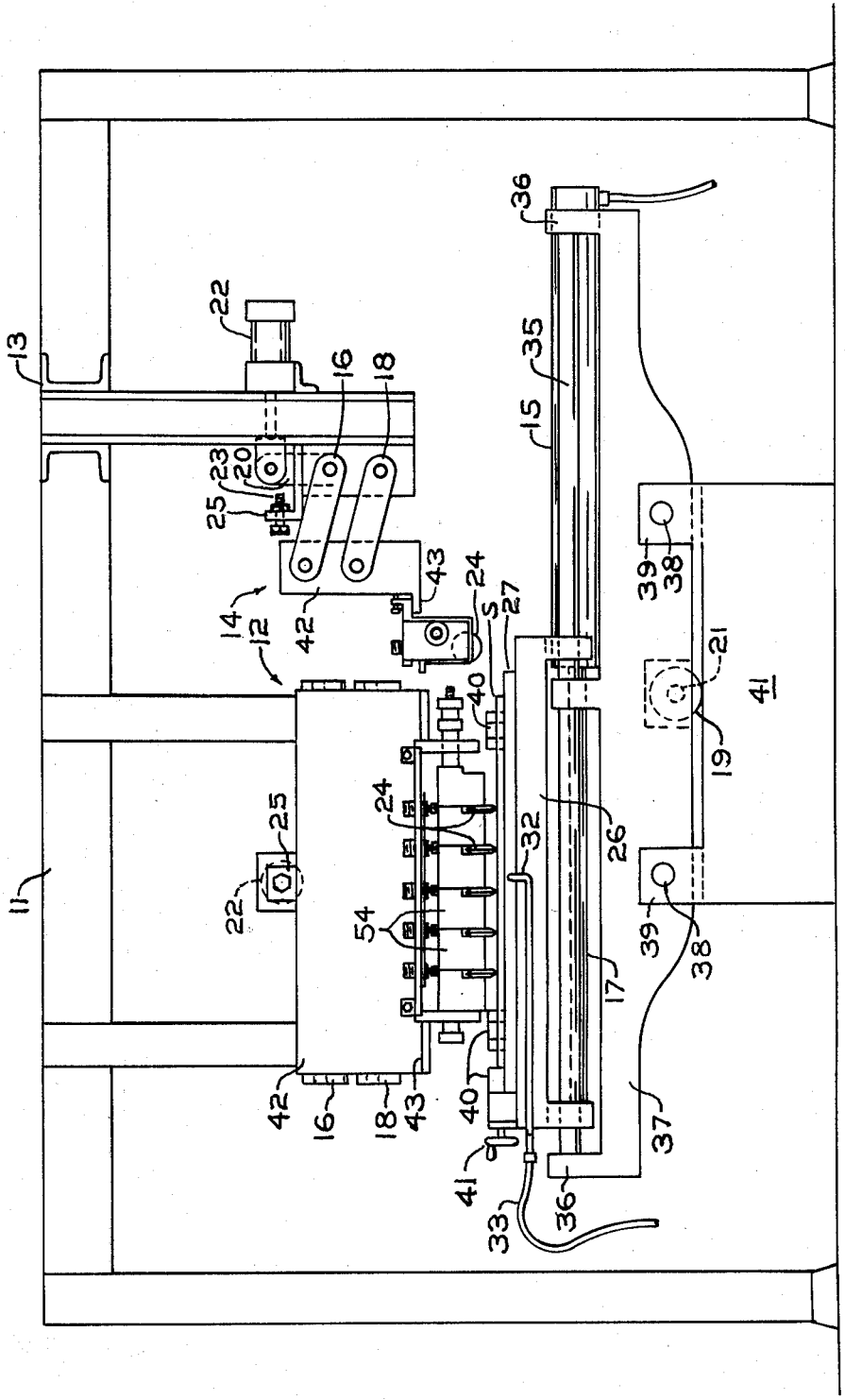
FIG. 1 is a side view of an overall scoring apparatus adapted for scoring in two directions.

Referring to FIG. 1, a preferred embodiment of the invention is shown wherein a stationary bridge structure 10 rigidly supports two scoring frames shown generally as 12 and 14 positioned 90° to each other. The bridge structure could take any suitable form, such as a cantilevered beam or part of a building structure, the structure 10 shown in FIG. 1 being merely exemplary. Beam 11 supports scoring frame 12, and crossbeam 13 is cantilevered so as to support scoring frame 14 generally forward of frame 12 as viewed in FIG. 1. Each scoring frame is independently vertically moveable by means of link rods 16 and 18, wherein rod 16 is power-driven by cylinder 22 by way of pivot bar 20 which is mounted on a common shaft with rod 16. Such vertical movement permits a plurality of scoring wheels 24 held by the scoring frames to be retracted from the surface of the sheet of glass S held on table 26 to be pressed against the surface of the glass at a preselected pressure to effect the scoring. In FIG. 1, frame 12 is shown in the lowered position and frame 14 is in the retracted position. Both scoring frames are provided with limit means 23 which are threaded through brackets 25 to contact pivot rods 20 when each pivot rod is moved forward, thereby limiting its forward travel. By adjusting the limit means, the distance the frame will be lowered can be varied and the pressure on the scoring tools will accordingly be varied uniformly. In this manner a preselected pressure can be accurately reproduced on every sheet of glass scored during a given production run, and only one adjustment is needed to change the scoring pressure of the entire bank of scoring tools held on a scoring frame, rather than adjusting each scoring tool individually and thereby introducing unwanted pressure variations between tools on the frame.

Figure 2:
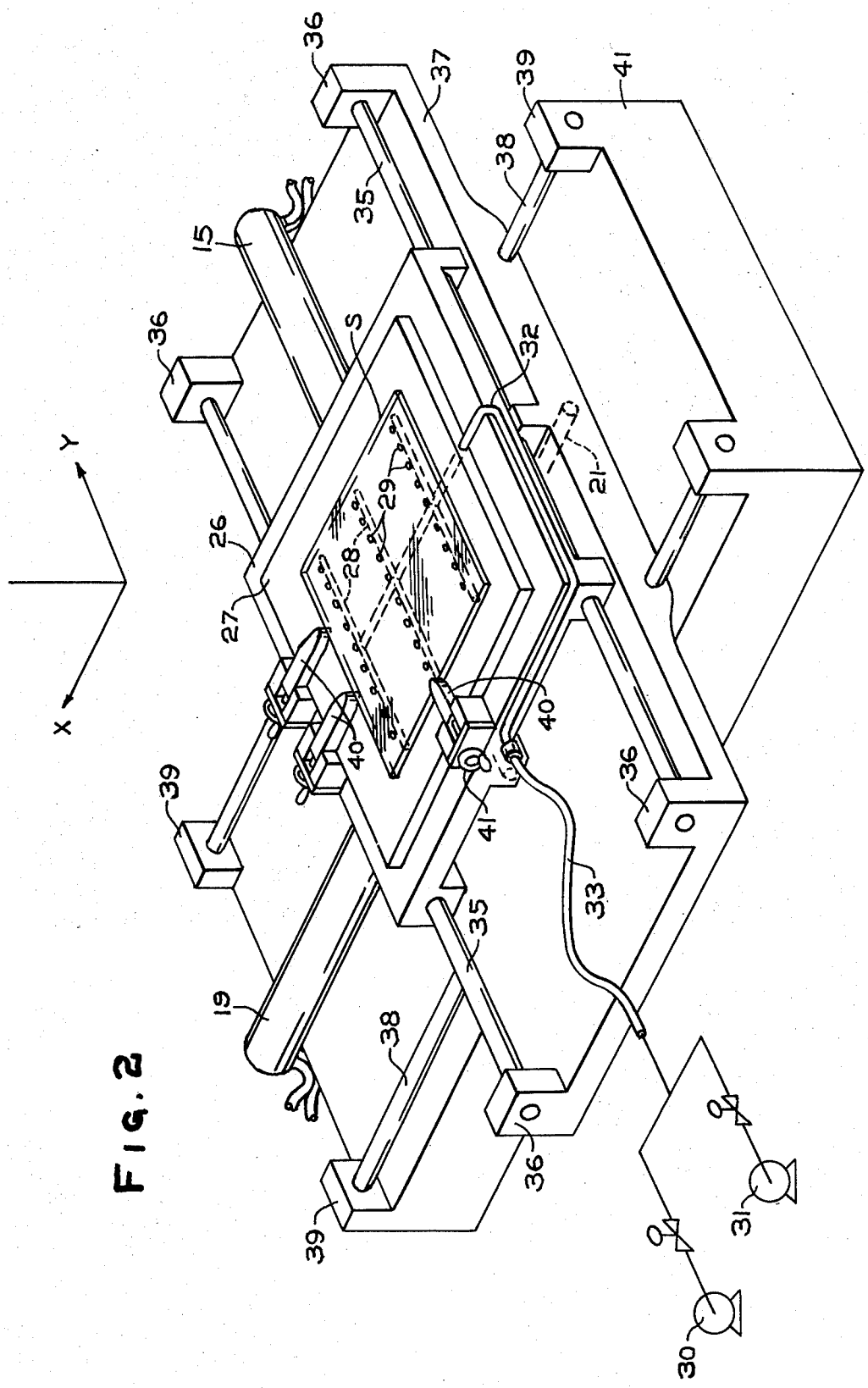
FIG. 2 is a perspective view of a glass support table and translating means.

Table 26 has a smoothly finished face plate 27 affixed to its top surface. As shown in FIG. 2, the underside of face plate 27 is provided with a network of airtight, interconnecting channels 28 which can be put in communication with either a vacuum source 30 or a pressure source 31 (both shown schematically) by way of pipe 32 and flexible conduit 33. The upper surface of face plate 27 has a plurality of small holes 29 that extend to the channels. When a sheet of glass S is positioned on the table and ready for scoring, the vacuum source may be activated, causing the sheet to the drawn to the surface of the face plate with sufficient force to hold it in place during the scoring operation. When placing the glass sheet onto the table and when removing it, the positive pressure source may be activated to cause the sheet to "float" on a thin layer of air between the sheet and the surface of the plate. In this manner the sheet can be loaded and unloaded with minimum physical contact which might mar the glass or a coating on the glass.

Referring to FIGS. 1 and 2, table 26 is slideably mounted on guide rods 35 supported at each end by blocks 36 which are fixed to saddle 37. Saddle 37 is mounted for sliding in the transverse direction on guide rods 38 which are supported at each end by blocks 39 fixed to base 41. Any suitable drive means may be utilized to propel the table and saddle in their respective directions. A suitable arrangement has been found to be the provision of hydraulic cylinder 15 supported on the saddle having a rod 17 connected to the table on its underside, and another cylinder 19 on the base having a rod 21 connected to the underside of the saddle. A suitable table, saddle, and base, as well as their motive means, are commercially available as the "30 × 20 Spacer Table" made by the Bullard Company, Bridgeport, Conneticut, and form no part of the present invention in themselves. It should be apparent that the preferred arrangement shown in the figures permits the glass sheet S positioned on table 26 to be passed beneath the first scoring frame 12 (in what will be referred to as the X direction) by propelling the saddle 37, and subsequently beneath the second scoring frame 14 (the Y direction) by propelling table 26. Any of the various means known in the art for providing relative motion between a piece of glass and a bank of scoring tools may be employed instead.

When a large number of identical glass sheets are being cut, it may be advantageous to also provide the table with edge stops 40, as shown in FIGS. 1 and 2, to aid in aligning each sheet. The stops are threaded to screw shafts (not shown) so that the stops may be extended or retracted by turning cranks 41. Each screw shaft may be provided with a set screw to lock the stop in a given position.

Figure 6:
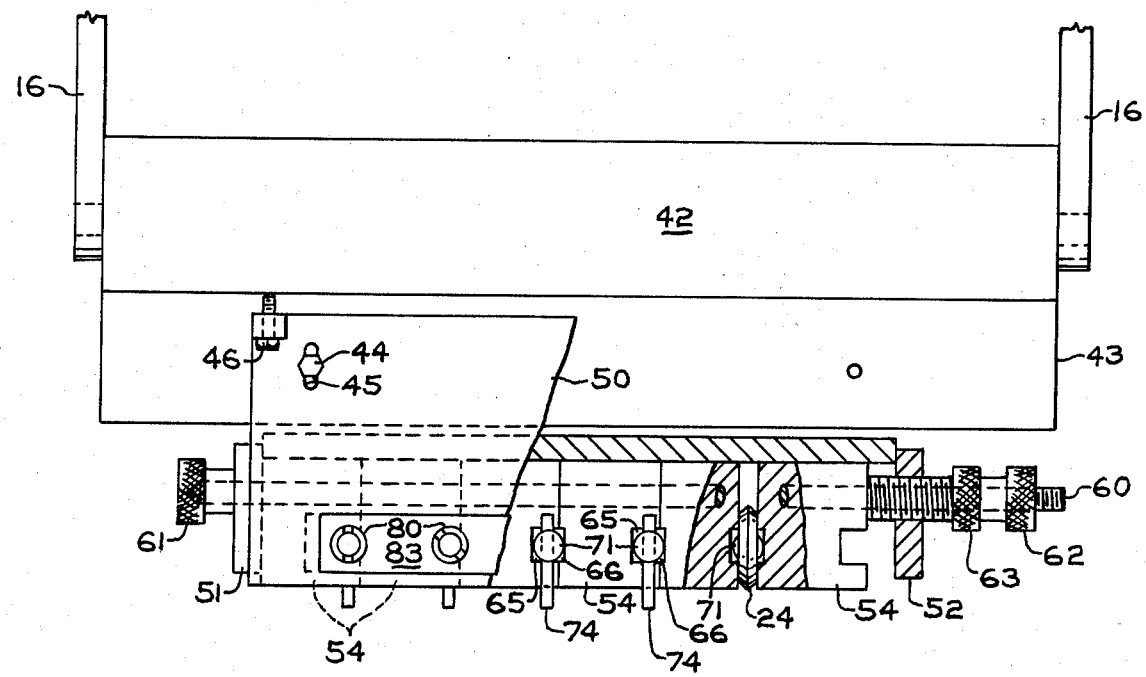
FIG. 6 is a top view of the scoring frame shown in FIG. 3.
Figure 3:
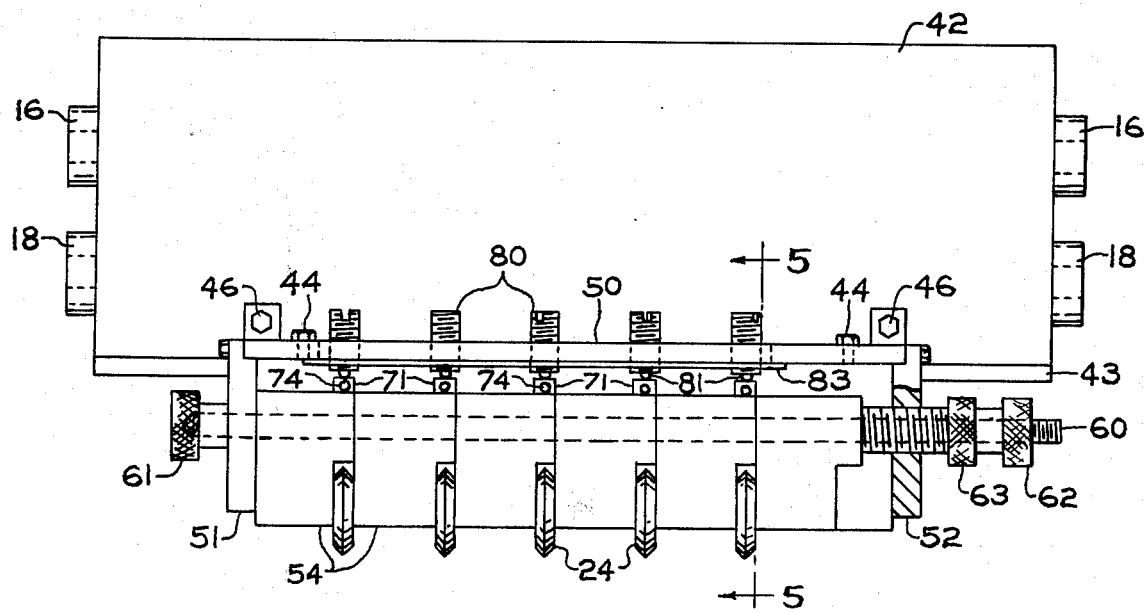
FIG. 3 is a front view, partly broken away, showing the details of a preferred embodiment of a scoring frame.
Figure 4:
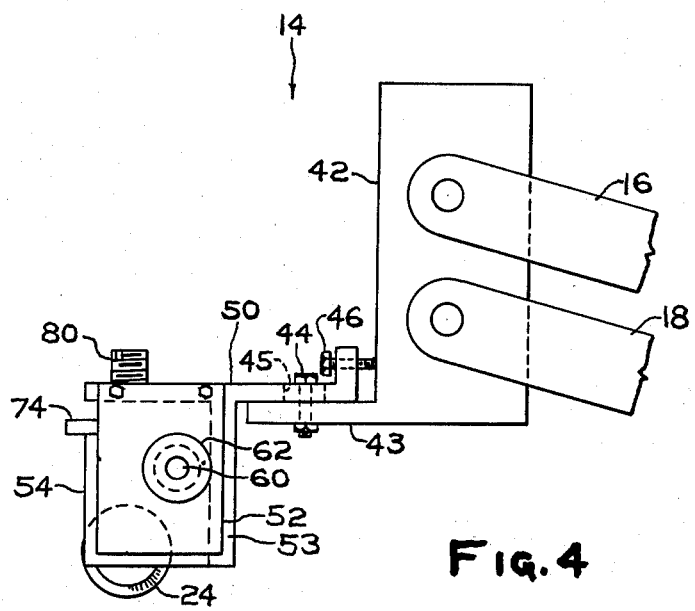
FIG. 4 is a side view of the scoring frame shown in FIG. 3.

Each scoring frame has a base 42 having an extension 43 onto which the novel scoring wheel holder assembly of the present invention may be fastened. In the specific embodiment shown in the drawings, the wheel holder assembly may be based on a T-shaped brace 50 (FIGS. 3, 4 and 6), one arm of which is bolted to extension 43. Bolts 44 are preferably inserted through slotted holes 45 which, together with set screws 46, permit the assembly to be squared with the direction of the score. End plates 51 and 52 are affixed to opposite ends of the brace 50, and together with downwardly extending leg 53 of the brace form a recess in which a plurality of spacer blocks 54, preferably made of steel, are received. Each block includes a bore 55 (see FIGS. 7, 8 and 9) extending through the full width of the block, which permits the blocks to be slip-fitted onto a rod 60 where they fit snugly against the downwardly extending leg 53 of brace 50. Rod 60 extends through end plates 15 and 52 and is threaded at its ends for receiving retainer knobs 61 and 62 which hold the rod in place. A tightening knob 63 is provided with an exteriorly threaded tubular extension which loosely fits over rod 60 and, when screwed into a threaded bore in end plate 52, bears against the end spacer block, thereby pressing the blocks together and holding them as a rigid unit.

Figure 9:
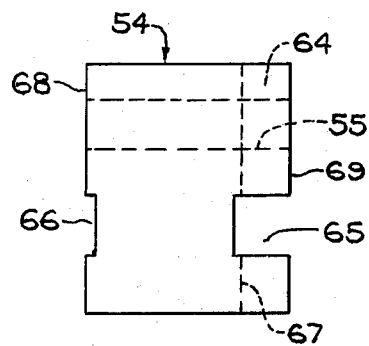
FIGS. 7, 8 and 9 are front, side, and top views, respectively, of an individual spacer block.
Figure 7:
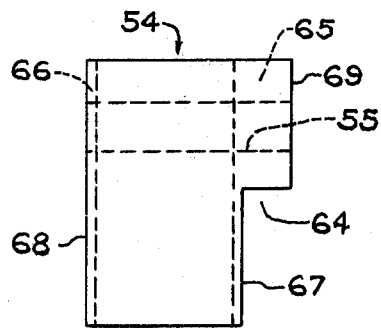
Figure 8:
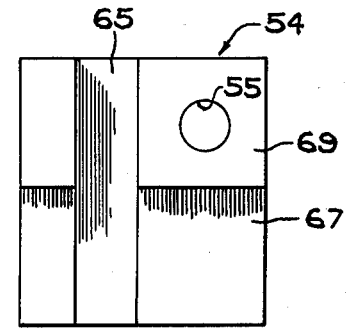

Appropriate grooves may be machined into each spacer block to enable the blocks to serve as scoring wheel holders. A preferred mode of growing the blocks is shown in FIGS. 7, 8 and 9, which depict front, side, and top views, respectively, of one spacer block 54. A horizontal indentation 64 is ground out of one corner of the block to form a space for the scoring wheel itself. When several blocks are placed side by side, the space between surface 67 of one block and surface 68 of an adjacent block forms a slot for receiving and guiding a scoring wheel. Because both surfaces 67 and 68 may be open face ground and polished to very close tolerances, the minimum clearance for movement of the scoring wheel within the slot can be provided with a higher degree of precision than with a slot cut into a single piece of metal. As a result, wobble of each scoring wheel within its slot is minimized, and the regularity of the parallel score lines produced in a piece of glass can be maintained almost perfectly constant. Similarly, the spacing of the scoring wheels may be very accurately established because the width of each spacer block can be machined to close tolerances by open face grinding and polishing surfaces 68 and 69. The critical dimensions of the spacer blocks can therefore be readily made accurate to within, for example, about 0.0005 inch (12.5 microns).

Figure 5:
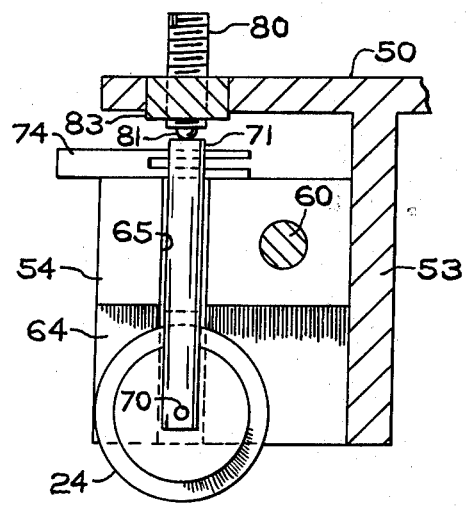
FIG. 5 is a vertical cross-section along line 5—5 of FIG. 3.
Figure 11:
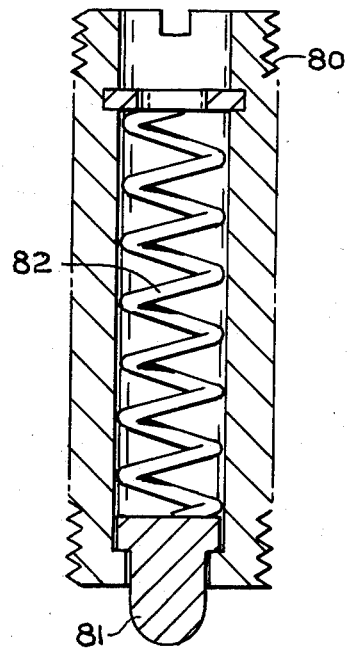
FIG. 11 is an enlarged vertical cross-section of a spring plunger used in the FIG. 3 embodiment.
Figure 10:
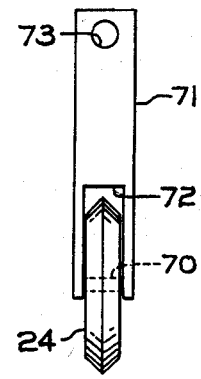
FIG. 10 is a front view of a single scoring wheel on a stem.

In order to provide means for retaining each scoring wheel in its slot, each block includes vertical grooves 65 and 66 which are adapted to freely hold a stem 71 when two or more blocks are placed side by side. As shown in FIGS. 5 and 10, each stem 71 is provided with a slot 72 at its lower end within which a scoring wheel 24 is loosely held on an axle 70. A transverse bore 73 at the upper end of stem 71 is adapted to receive a retainer pin 74 which prevents the stem from falling out of its groove when the scoring frame is raised. Grooves 65 and 66 as well as stems 71 and their slots 72 need not be fabricated with a high degree of precision since the stability of the scoring wheels is assured by the accurately ground surfaces 67 and 68 on the spacer blocks. An adjustable scoring force is exerted on each stem by a spring plunger which includes a cylindrical body 80 threaded through a bore in an insert 83 held in a forward portion of brace 50. Insert 83 is preferably friction-fitted into an opening in brace 50 so as to be readily interchangeable with other inserts having different bore spacings. Each spring plunger includes a nub 81 which contacts the upper end of a stem 71. As can be seen in the enlarged cross-sectional view of FIG. 11, a coil spring 82 within the threaded cylinder 80 resiliently urges nub 81 in a downward direction. When the scoring frame is lowered onto the surface of a sheet of glass to be scored, the scoring wheels are slightly displaced upwardly, causing stem 71 and nub 81 to compress spring 82, thereby generating a downward scoring force of predetermined magnitude. By adjusting the threaded cylinders 80, the amount of compression in the springs, and therefore the scoring force on each scoring wheel, can be varied.

It should be apparent from the foregoing description that the preferred embodiment of the invention permits the number of scoring wheels or the spacing between scoring wheels to be changed quickly without sacrificing accuracy merely by removing or adding spacer blocks or by substituting spacer blocks of a different width. This may be easily accomplished by unscrewing knob 62, loosening knob 63, and sliding out rod 60. Spacer blocks may then be removed and added as desired. In the event that the wheel spacing is changed, it would also be necessary to replace the screw plunger insert 83 with another insert having appropriate bore spacings for the spring plungers to be centered over the wheel stems 71.

It is to be understood that modifications and variations as are known to those of skill in the art may be made in the preferred embodiment described herein without departing from the spirit and scope of the invention as defined by the appended claims.

I claim:

1. An apparatus for scoring a piece of glass along a plurality of parallel lines, comprising:
   a plurality of discrete spacer blocks adjoining one another in a row, each block adjoining at least one adjacent block with a first planar surface on one block contacting a second planar surface on the adjacent block;
   an indentation in each of said first planar surfaces defining with the respective adjacent second planar surface a slot for receiving a scoring wheel;
   a plurality of scoring wheels, each retained within one of said slots; and
   means for holding said row of blocks together as a rigid unit.

2. The apparatus of claim 1 wherein each of said scoring wheels is free to rotate on an axle which is carried by a stem, and said blocks are provided with grooves within which said stems are received and are free to slide vertically.

3. The apparatus of claim 2 wherein each stem has associated therewith adjustable means for exerting a downward force on the stem.

4. The apparatus of claim 3 wherein said means for holding said blocks includes a retainer rod extending along said row of blocks and slideably engaging each of said blocks, and tightening means for pressing said blocks together in the row.

5. The apparatus of claim 1 wherein each of said indentations comprises a planar surface parallel to said first planar surface of the respective block.

* * * * *